(12) United States Patent
Madawala et al.

(10) Patent No.: US 9,660,702 B2
(45) Date of Patent: May 23, 2017

(54) LOAD CONTROL FOR BI-DIRECTIONAL INDUCTIVE POWER TRANSFER SYSTEMS

(75) Inventors: Udaya Kumara Madawala, Auckland (NZ); Duleepa Jayanath Thrimawithana, Auckland (NZ)

(73) Assignee: Auckland UniServices Limited, Auckland (NZ)

( * ) Notice: Subject to any disclaimer, the term of this patent is extended or adjusted under 35 U.S.C. 154(b) by 617 days.

(21) Appl. No.: 14/127,882

(22) PCT Filed: Jun. 27, 2012

(86) PCT No.: PCT/NZ2012/000107
§ 371 (c)(1),
(2), (4) Date: Mar. 10, 2014

(87) PCT Pub. No.: WO2013/002651
PCT Pub. Date: Jan. 3, 2013

(65) Prior Publication Data
US 2014/0203659 A1    Jul. 24, 2014

(30) Foreign Application Priority Data

Jun. 27, 2011    (NZ) ......................... 593764

(51) Int. Cl.
*H02J 5/00* (2016.01)
*H02J 7/02* (2016.01)
(Continued)

(52) U.S. Cl.
CPC .......... *H04B 5/0075* (2013.01); *B60L 11/182* (2013.01); *B60L 11/1842* (2013.01);
(Continued)

(58) Field of Classification Search
CPC .. H02J 5/005; H02J 7/025; H02J 17/00; H02J 50/10; H02J 3/32; B60L 11/182;
(Continued)

(56) References Cited

U.S. PATENT DOCUMENTS

| | | | | |
|---|---|---|---|---|
| 7,843,707 B2 * | 11/2010 | Chen | ....................... | H02J 5/005 363/17 |
| 8,143,746 B2 * | 3/2012 | Marzetta | ................. | H02J 5/005 307/104 |
| 8,299,652 B2 * | 10/2012 | Sample | ................ | H04B 5/0081 307/104 |
| 8,829,724 B2 * | 9/2014 | Ryu | ........................ | H02J 5/005 307/104 |

(Continued)

FOREIGN PATENT DOCUMENTS

| | | |
|---|---|---|
| CN | 201365144 Y | 12/2009 |
| CN | 201733141 | 2/2011 |

(Continued)

OTHER PUBLICATIONS

Extended European Search Report for Application No. PCT/NZ2012000107 dated Sep. 4, 2015.

(Continued)

*Primary Examiner* — Ryan Johnson
(74) *Attorney, Agent, or Firm* — Farjami & Farjami LLP (57) ABSTRACT

A control method for use in a primary side power converter (1) of an inductive power transfer (IPT) system. The power transfer from the primary side to one or more secondary pick-ups is monitored, and the operating frequency of the primary side power converter (1) is varied in proportion to a difference between the monitored power transfer and a power capability of the primary side power converter. The frequency variation can be sensed by the or each pick-up (2) to regulate the power transfer and to prevent overloading from occurring.

20 Claims, 6 Drawing Sheets

(51) Int. Cl.
  *B60L 11/18* (2006.01)
  *H04B 5/00* (2006.01)
  *H02J 50/10* (2016.01)
  *H02M 7/797* (2006.01)
  *H02M 1/00* (2006.01)
  *H02M 7/48* (2007.01)

(52) U.S. Cl.
  CPC ....... *B60L 11/1844* (2013.01); *B60L 11/1846* (2013.01); *H02J 5/005* (2013.01); *H02J 50/10* (2016.02); *H02M 7/797* (2013.01); *B60L 2210/10* (2013.01); *B60L 2210/30* (2013.01); *B60L 2210/40* (2013.01); *H02M 2001/008* (2013.01); *H02M 2007/4815* (2013.01); *Y02E 60/721* (2013.01); *Y02T 10/7005* (2013.01); *Y02T 10/7072* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
  CPC . B60L 11/1842; H04B 5/0075; H04B 5/0037; Y02E 60/721; Y02T 90/122; Y02T 90/128; Y04S 10/12; Y04S 10/126; H01F 38/14
  See application file for complete search history.

(56) References Cited

U.S. PATENT DOCUMENTS 8,829,726 B2\* 9/2014 Urano ................... H02J 5/005
  307/104
2007/0109708 A1 5/2007 Hussman

FOREIGN PATENT DOCUMENTS

| DE | 4442677 A1 | 6/1996 |
| EP | 2302760 A2 | 3/2011 |
| WO | WO 93/23908 | 11/1993 |
| WO | WO 2005/031944 A1 | 4/2005 |
| WO | WO 2010/062198 | 6/2010 |
| WO | WO 2010/104569 A1 | 9/2010 |

OTHER PUBLICATIONS

Translation of the first office action for Application No. 2012800305032 dated Jul. 14, 2015.
Wang, et al. "*Design Considerations for a Contactless Electric Vehicle Battery Charger*" IEEE Transactions on Industrial Electronics, vol. 52, No. 5, Oct. 2005, p. 1308-1314.
PCT International Preliminary Report on Patentability dated Jan. 7, 2014 in PCT Application No. PCT/NZ2012/000107.
PCT International Search Report dated Nov. 6, 2012 in PCT Application No. PCT/NZ2012/000107.

\* cited by examiner

Figure 11
Primary side controller

LOAD CONTROL FOR BI-DIRECTIONAL INDUCTIVE POWER TRANSFER SYSTEMS

This is a U.S. national phase application, which is based on, and claims priority from, PCT application Serial No. PCT/NZ2012/000107, filed Jun. 27, 2012, which claims priority from New Zealand Application Serial No. 593764, filed Jun. 27, 2011.

FIELD

This invention relates to a method and apparatus for balancing loads in inductive power transfer (IPT) systems. The invention is particularly suited to bi-directional multiple-pick-up IPT systems, but may also be used in a uni-directional and/or single-pick-up system.

BACKGROUND

Inductive power transfer (IPT) systems are known and used in a number of applications. IPT technology offers high efficiency, typically 85-90%, and is capable of operating in hostile environments, being unaffected by dirt and moisture.

A typical IPT system consists of three main components: an AC power supply; a primary conductive path, coil, or pad electrically coupled to the power supply; and at least one electrically isolated pick-up which, in use, is inductively coupled with the primary winding to supply power to a load. The power supply and primary winding are commonly said to comprise the primary side of the (PT system, and the pick-up(s) and associated load(s) comprise the secondary side of the system.

Traditionally, the power supply would be electrically coupled to an electrical supply network (commonly referred to as the "grid") and used to energize the primary winding for contactless uni-directional power transfer from the grid to the load(s). The primary winding is energised by a converter, derived from the AC or grid power supply, to create a high frequency AC current in the primary winding, which in turn results in generating a continuously varying magnetic field about the primary winding. The or each pick-up, separated from the primary winding by an air gap, includes a coil in which a voltage is induced by the changing magnetic flux passing through the coil in accordance with Faraday's law of induction, thereby achieving contactless power transfer.

Generally a converter, serving as an inverter, on the primary side and a simple switch mode regulator on the pick-up side are adequate to control the power flow in uni-directional IPT systems, as only the primary side sources power.

Bi-directional IPT systems are ideal for applications such as electric vehicles (EVs) and vehicle-to-grid (V2G) systems, for example, in which 'contactless' two way power transfer is desirable, for the purpose of balancing the load on the grid.

However, the power flow of bi-directional IPT systems must be regulated using a more sophisticated control strategy in comparison to uni-directional systems.

In contrast to a uni-directional IPT system, both the primary and pick-up sides of a bi-directional IPT system must be configured to serve as either a source or a sink. Consequently, identical or similar converter topologies are required on both sides of the system to facilitate either AC-DC or DC-AC power conversion, depending on the direction of power flow.

To minimize the VA ratings of converters for any given power level, parallel or series compensation is usually provided for coil inductances of both the primary and pick-up. Thus bi-directional IPT systems are higher order resonant networks, and require more sophisticated and robust control.

The amount and direction of power flow are usually controlled by either relative phase or magnitude control of the voltages produced by converters, using dedicated controllers. However, a robust mechanism is essential to ensure that the power demand from one side can be met by the supplying side without exceeding its power rating.

Converters employed in parallel compensated IPT systems naturally behave as a current source. In such systems, limiting the operation of the sourcing side to its maximum or rated power level has always been a challenge, especially when the pick-up demand exceeds the power handling capability of the sourcing converter. Prime examples occur when the magnetic coupling between the two sides improves or pick-ups with varying power demands are to be catered for by a single primary converter as in the case of electric vehicles (EVs) charged at a charging bay. Moreover, sharing and prioritizing of power delivery among multiple pick-ups can also be regarded as a challenge for any given input power.

Power supplied by the primary can be limited by lowering the primary coil or track current upon detection of an excessive power demand. But this strategy will not suit multiple pick-up IPT systems as it compromises the power delivery to other pick-ups. Moreover, single pick-up IPT systems that use lower track currents operate at relatively high quality factors, leading to more circulating energy and making the system more susceptible to component tolerances.

An alternative solution is to employ a dedicated wireless communication interface between the primary side and the or each pick-up. The maximum power capability of the primary can then be relayed to pick-ups through the wireless interface, requesting that the power intake should be limited. However, such a wireless interface would obviously be expensive in terms of component count and complexity as it requires additional hardware and software.

OBJECT OF THE INVENTION

It is therefore an object of the invention to provide a method and/or apparatus which overcomes or ameliorates one or more problems of the prior art, or at least to provide the public with a useful choice.

Further objects of the invention will become apparent from the following description.

SUMMARY OF INVENTION

In a first aspect, the invention may broadly be said to consist in a load control method for use in an inductive power transfer (IPT) system having a primary side and a secondary side, wherein the method comprises the steps of:
  sensing, at the primary side, power transfer between the primary and secondary sides;
  varying the operating frequency of a converter of the primary side with respect to a tuned frequency, in proportion to a difference between the power transfer and a power capability of the primary side;
  sensing, at the secondary side, said variations in operating frequency; and regulating, at the secondary side, said power transfer in proportion to said variations of the operating frequency so as not to exceed the power capability of the primary side.

Preferably the step of varying the operating frequency comprises varying the operating frequency in a series of incremental steps.

Preferably the step of varying the operating frequency comprises periodically varying the operating frequency.

Preferably said operating frequency is maintained for a full period of said periodic variation.

Alternatively, said operating frequency is maintained for a portion of each period, and the step further involves reverting to the tuned frequency for the remainder of each period.

Preferably the tuned frequency is a frequency to which resonant circuits of both the primary and secondary sides are tuned.

Preferably the tuned frequency is between 10 kHz and 100 kHz.

Preferably the operating frequency is varied within a predetermined range of the tuned frequency.

Preferably the predetermined range is substantially ±1 kHz or a similar range to minimize the VA ratings of converters.

In a second aspect, the invention may broadly be said to consist in a control method for use in a primary side power converter of an inductive power transfer (IPT) system, the method comprising the steps of:
  sensing power transfer between the primary side power converter and one or more IPT pick-ups with which the primary side power converter may be inductively coupled, in use; and
  varying the frequency of the primary side power converter with respect to a tuned frequency in proportion to a difference between said power transfer and a power capability of the primary side power converter, whereby said variation may be sensed by the or each pick-up to regulate said power transfer.

Preferably the step for varying the operating frequency comprises varying the operating frequency in incremental steps.

Preferably the step of varying the operating frequency comprises periodically varying the operating frequency.

Preferably the step of varying the operating frequency comprises maintaining the operating frequency for a portion of each period, and reverting to the tuned frequency for the remainder of each period.

Preferably the tuned frequency is a frequency to which resonant circuits of both the primary and secondary sides are tuned.

Preferably the method includes continuously monitoring the power transfer.

Alternatively the method includes the step of periodically monitoring the power transfer.

Preferably the method includes the step of varying the operating frequency within a predetermined range of the tuned frequency.

Preferably the method further includes the step of regulating the primary side power converter to maintain a constant track current.

Preferably the step of regulating the primary side power converter comprises controlling the duty cycle of the primary converter.

In a third aspect, the invention may broadly be said to consist in a control method for use in a pick-up of an inductive power transfer (IPT) system, the method comprising the steps of:
  sensing variations in an operating frequency of an alternating current of a primary side of the IPT system with which the pick-up is inductively coupled, in use; and
  regulating power transfer between the pick-up and a load with which the pick-up may be electrically coupled in use, in proportion with said variation from a tuned frequency so as not to exceed the power capability of the primary side.

Preferably the method further comprises the steps of:
  determining the difference between the operating frequency and the tuned frequency; and
  regulating the power transfer in proportion to said difference.

Preferably the step of regulating power transfer comprises controlling a duty cycle of a pick-up converter.

Preferably the method further includes the step of matching a frequency of the converter with the operating frequency where the alternating current maintains the operating frequency continuously.

Alternatively, the method may include the step of matching a frequency of the converter with the tuned frequency where the alternating current alternates between the operating frequency and the tuned frequency.

In a fourth aspect, the invention may broadly be said to consist in an inductive power transfer primary side power converter, the converter including a sensing means to sense power transfer between the primary side power converter and one or more IPT pick-ups with which the primary side power converter may be inductively coupled in use; and control means for varying the operating frequency of the primary side power converter with respect to a tuned frequency in proportion to a difference between said power transfer and a power capability of the primary side power converter, whereby said variation may be sensed by the or each pick-up to regulate said power transfer.

Preferably the control means varies the operating frequency comprises varying the operating frequency incremental steps.

Preferably the control means periodically varies the operating frequency.

Preferably the control means maintains the operating frequency for a portion of each period, and reverts to the tuned frequency for the remainder of each period.

Preferably the tuned frequency is a frequency to which resonant circuits of both the primary and secondary sides are tuned.

Preferably the control means continuously monitoring the power transfer.

Alternatively the control means periodically monitoring the power transfer.

Preferably the control means varies the operating frequency within a predetermined range of the tuned frequency.

In a fifth aspect, the invention may broadly be said to consist in an inductive power transfer (IPT) system pick-up adapted to perform the method of the third aspect of the invention.

In a sixth aspect, the invention may broadly be said to consist in an inductive power transfer (IPT) system adapted to perform the method of the first aspect of the invention, or including a primary side power converter of the fourth aspect of the invention and at least one pick-up of the fifth aspect of the invention.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Throughout the description like reference numerals will be used to refer to like features in different embodiments.

The present invention provides a method and apparatus which uses the power-frequency characteristics of IPT systems to regulate power flow in either direction. It allows for the operation of the primary converter at maximum power level when pick-up demand exceeds the power capability of the primary supply. According to the present invention, referred to herein as a droop control, the primary side behaves as the master and varies the frequency of operation to relay information with regard to its power capability to the or each pick-up. The primary ensures that the system always operates at the tuned or designed frequency at rated power. At any other power level, the system operates within a small range of frequencies, centred about the tuned frequency, without compromising the VA requirement of the system. Each pick-up extracts power from the primary according to the primary frequency as dictated by the droop characteristics.

The droop control concept is equally applicable to uni-directional and bi-directional IPT systems with either single or multiple pick-ups on the secondary side. It is relatively straightforward to implement and is particularly attractive for EV applications such as vehicle-to-grid (V2G) and grid-to-vehicle (G2V) systems, where fleets of EVs may be charged or discharged at charging bays.

Figure 1:
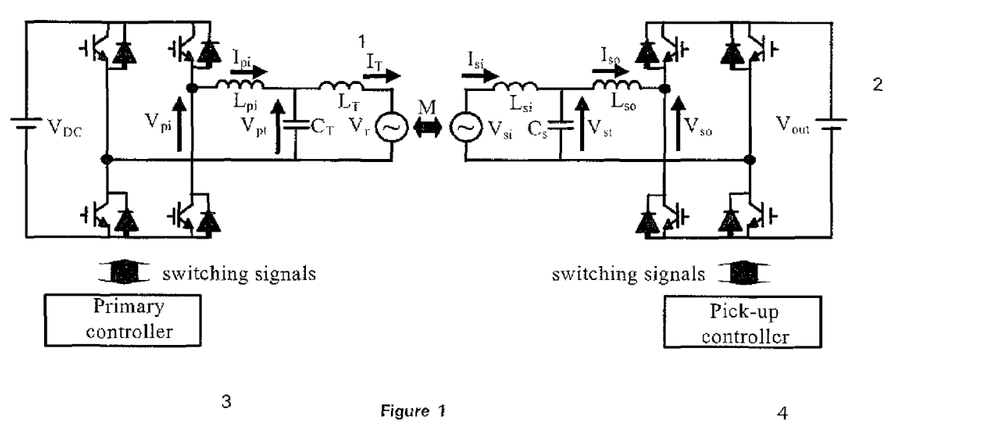
FIG. 1 is a schematic diagram of a bi-directional IPT system according to the prior art.

FIG. 1 shows a bi-directional IPT system of the prior art, as described in International Patent Publication No. WO 2010/062198 entitled "Bi-directional inductive power transfer", for example, the contents of which are incorporated herein by reference.

The IPT system comprises a primary 1 and a secondary 2, which is referred to as a pick-up (only a single pick-up being shown). The primary 1 and the pick-up 2 are separated by an air-gap, and use identical electronic circuitry, comprising a converter, an inductor-capacitor-inductor (LCL) resonant network and a controller. The primary and secondary controllers 3, 4 are independent of each other, and operate the converters on each side to regulate the power flow across the air-gap. The primary controller operates the primary side converter, which is connected to the LCL resonant network $L_{pi}$, $C_T$, $L_T$ to produce a constant sinusoidal current in the primary winding, referred to as the track and represented by coil $L_T$, at the desired frequency. In typical IPT systems, the frequency of operation ranges from 10-100 kHz. The track inductance $L_T$ is magnetically coupled to the secondary or pick-up coil $L_{si}$. Thus the LCL circuit for the pick-up 2 comprises $L_{si}$, $C_S$ and $L_{so}$.

The LCL circuits on both sides of the system are tuned to the frequency of the track current which is usually generated by the converter on the primary or sourcing side 1. Each converter of the IPT system is operated either in the inverting or rectifying mode, depending on the direction of power flow. The amount and direction of the power flow can be controlled through relative phase angle and/or magnitude of voltages generated by the converters, as described below.

If the primary side converter produces a reference sinusoidal voltage $V_{pi}\angle 0$ at an angular frequency $\omega$, and the track current $I_T$ is held constant by the primary side controller 3. At a steady state the induced voltage $V_{si}$ in the pick-up coil $L_{si}$ due to track current $I_T$ can be given by Eq. (1):

$$V_{si} = j\omega M I_T \quad (1)$$

where M represents the magnetic coupling between the track inductance $L_T$ and pick-up coil inductance $L_{si}$.

The pick-up may be operated either as a source or a sink by the secondary controller. Regardless of the mode of operation, the voltage $V_r$ reflected into the track can be expressed by Eq. (2):

$$V_r = -j\omega M I_{si} \quad (2)$$

If the LCL circuits on both the primary and pick-up sides are tuned to the angular frequency $\omega$, and $L_{pi}=L_T$ and $L_{si}=L_{so}$, then:

$$\omega^2 = \frac{1}{L_{pi}C_T} = \frac{1}{L_T C_T} = \frac{1}{L_{si}C_S} = \frac{1}{L_{so}C_S} \quad (3)(a)$$

Usually a DC blocking capacitor $C_{pi}$ is connected in series with the inductor $L_{pi}$ and primary side converter. Similarly, a DC blocking capacitor $C_{so}$ is also connected in series with the inductor $L_{so}$ and the pickup side converter. In this situation, the effective inductances $L_{pi,e}$ and $L_{so,e}$ between the primary converter and $C_T$, and between the pickup converter and $C_s$ are given by $$L_{pi,e} = L_{pi} - \frac{1}{\omega^2 C_{pi}} = L_T \quad (4)(b)$$

&

$$L_{so,e} = L_{so} - \frac{1}{\omega^2 C_{So}} = L_{si}$$

And satisfy the condition $$\omega^2 = \frac{1}{L_{pi}C_T} = \frac{1}{L_T C_T} = \frac{1}{L_{si}C_S} = \frac{1}{L_{so,e}C_S} \quad (5)(c)$$

Under these conditions, it can be shown that the input current $I_{pi}$ and track current $I_T$ of the primary side 1 are given by Eq. (4) and (5).

$$I_{pi} = j\frac{V_r}{\omega L_T} \quad (6)$$

$$I_T = -j\frac{V_{pi}}{\omega L_T} \quad (7)$$

Similarly, the input and output current $I_{si}$ and $I_{so}$ of the pick-up circuit 2 can be given by Eq. (6) and (7).

$$I_{si} = j\frac{V_{so}}{\omega L_{si}} \quad (8)$$

$$I_{so} = -j\frac{V_{si}}{\omega L_{si}} \quad (9)$$

Solving for $I_{so}$ using Eq. (1)-(7), $$I_{so} = j\frac{M}{L_{si}} \frac{V_{pi}}{\omega L_T} \quad (10)$$

If the equivalent AC voltage of the output or the input voltage of the pick-up side 2 converter is given by $V_{so}\angle-\theta$, then the power output $P_o$ of the pick-up is given by Eq. (9).

$$P_o = Re\{V_{so}(-I_{so})^*\} \quad (11)$$

Substituting for $V_{so}$ and $I_{so}$ in (9), $$P_o = -\frac{M}{L_{si}} \frac{|V_{pi}|}{\omega L_T}|V_{so}|\sin(\theta) \quad (12)$$

It is evident from Eq. (10) that maximum power transfer takes place when the phase angle ? is ±90°. A leading phase angle constitutes power transfer from the pick-up to the primary while a lagging phase angle enables power transfer from the primary to the pick-up. Thus for any given primary and pick-up voltages, both the amount and direction of power flow between the primary and the pick-up can be regulated by controlling both the magnitude and relative phase angle of the voltages generated by the primary and secondary converters.

Figure 2:
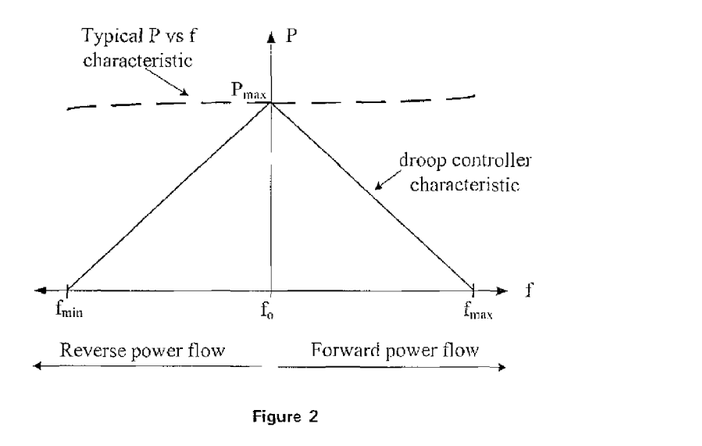
FIG. 2 is a chart of the power vs frequency characteristic of the present invention.

According to the typical power vs frequency characteristic of IPT systems, the operation at the tuned frequency of the LCL networks will guarantee zero reactive power or VAR circulation and limit the required VA rating of converters to a minimum for any given power level. Operation of the system at a frequency that is below or above the tuned frequency will invariably result in VAR circulation and a drop in the maximum real power handling capability of the converters. However, the power vs frequency characteristic of IPT systems as illustrated in FIG. 2 indicates that small variations in operating frequency around the tuned frequency will cause neither a significant drop in power handling capability nor an increase in circulating energy to exceed the VA rating. This feature of the power-frequency characteristic of IPT systems is utilized in the present invention as described in further detail below.

FIRST EXAMPLE

The power vs frequency droop characteristic of an IPT system, shown in FIG. 2, illustrates how the frequency can be linearly varied to control the power flow according to the droop control technique of the present invention. It will be seen that in this example, and the other examples provided, a linear variation is not essential i.e. the variation of operating frequency may be in a non-linear proportion to a difference between the current power transfer and a power capability.

The primary side dictates the frequency of operation in accordance with the droop characteristic, while the pick-up converter simply follows. Both sides operate at the tuned frequency fo only when the system is delivering or receiving the rated power. At all other power levels, the system operates at slightly detuned frequency without violating the VA rating of the system.

The maximum and minimum frequencies of operation, fmax and fmin, correspond to the no load or zero power transfer operation of every primary and pick-up during the forward and reverse power flows, respectively. Usually fmax and fmin are set to several hundred hertz above or below the tuned frequency (typically a particular frequency within the range of 10-40 kHz). This relatively small change in frequency ensures that the LCL networks of both the primary and secondary converters remain substantially tuned, yet is large enough in comparison to the tuned frequency f0, to be detected by the primary/secondary controller. In one embodiment, the frequency is detected and measured using a phase lock loop (PLL) which is also used to synchronize the pickup to the primary. The output of the PLL is a square wave which is fed into an interrupt pin of a micro controller. A timer in the micro controller measures the time between interrupts and by averaging (or more as appropriate) successive interrupts the frequency of operation can be estimated.

The minimum change that can be detected depends on the speed of the timer in this case with a timer operating at 16 MHz the minimum change that can be detected is 50 Hz. This can be improved with a faster microcontroller.

Figure 3:
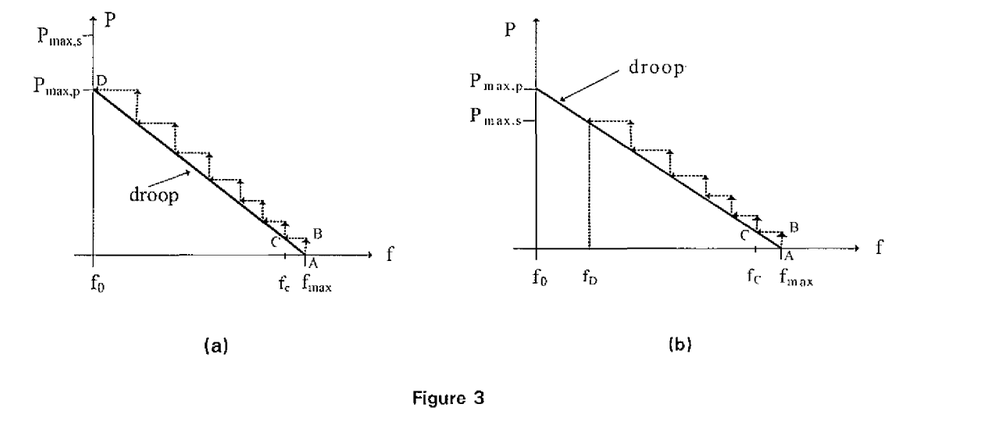
FIG. 3 is a chart illustrating operation of a droop controller according to the present invention, with the situation where (a) pick-up demand exceeds the power rating of the primary; and (b) the power rating of the primary exceeds pick-up demand.

The droop control is described by way of example with reference to FIGS. 3(a) and 3(b). Consider a situation when a pick-up, which has a power rating $P_{max,s}$ which is a higher power rating than that of the primary, (being $P_{max,p}$) begins to extract power from a primary converter which is idling at $f_{max}$ (i.e. having no load). This situation is illustrated by point A in FIG. 3(a). The pick-up controller 4 detects that the primary is idling at $f_{max}$ and begins extracting power, as shown by point B. In one embodiment, the primary controller 3 continuously or periodically monitors its power output at a sampling rate set by the controller 3. The power outputs from the samples are averaged to work out the estimated power output over a time period. The sampling rate is determined taking into account the frequency of operation and speed of the microcontroller, and in such a manner that the estimated output power is a good indication of the actual output power to be conveyed to the pickup side by varying the frequency. Realizing that the pick-up 2 has begun taking power, the primary converter reduces the operating frequency to $f_c$, shown by point C, at the next sampling instant. The pick-up 2 in turn locks into the 'new' operating frequency, realizes that the frequency is still above $f_0$ and, thus, continues to extract more power. This process continues until the operating frequency converges to the tuned frequency $f_0$ or point D on the droop characteristic. The pick-up 2, detecting that the frequency is $f_0$, realizes that the primary 1 is at the maximum possible power level and limits its power intake to $P_{max,p}$.

In contrast, FIG. 3(b) illustrates a situation, where pick-up demand is less than the primary power rating. In this situation, the system settles into a stable operating frequency $f_D$, corresponding to the power handling capability $P_{max,s}$ of the secondary, which is slightly greater than the tuned frequency $f_0$ which corresponds with the power handling capability $P_{max,P}$ of the primary If there is another pick-up, then it will also take power according to the frequency dictated by the primary controller. The primary estimates the power output (ie: taken by both pick ups) and accordingly changes its operating frequency, indicating its power capability (or the remaining power that can be supplied) to both pickups. This procedure continues until the primary reaches its power capability.

From the proposed droop characteristic in FIG. 2, it can be seen that the frequency of operation f is related to the primary power $P_p$ by Eq. (11).

$$f - f_o = (P_{max} - P_p)\frac{df}{dp} \quad (13)$$

where df/dp is the power vs frequency droop, which can be altered as desired. If the efficiency of the system is assumed to be η, then the pick-up power $P_s$ is related to the primary power $P_p$ by Eq. (12).

$$P_P = \eta P_s \quad (14)$$

Substituting Eq. (12) in (11), $$f = (P_{max} - \eta P_s)\frac{df}{dp} + f_o \quad (15)$$

$$P_s = \eta\left(\frac{f - f_o}{\frac{dp}{dt}} + P_{max}\right) \quad (16)$$

The frequency of operation and the power throughput can be analyzed using Eq. (13) and (14), which provide the relationships that are required to implement the proposed droop controller as described below.

According to Eq. (10), the power flow between the primary 1 and the pick-up 2 can be regulated through control of the voltage generated by the pick-up side converter at unity power factor for a given primary voltage. In one embodiment the primary converter is driven by a square-wave voltage to generate a constant voltage and keep the track current constant for all loads. The voltage generated by the pick-up converter $V_{si}$ is regulated, as desired by way of pulse width modulation. In the case of the H-bridge switch converter of FIG. 1, for example, the pick-up side converter has two legs (each leg containing two switches). The regulation 11 achieved by driving the legs with a phase-shift α with respect to each other. A phase-shift of 0° or 360° degrees generates a square-wave of the maximum possible voltage and corresponds to the maximum power flow in both directions (i.e. 100% duty cycle). In contrast, a phase shift of 180° generates a zero voltage (i.e. 0% duty cycle) as it creates a short circuit by effectively decoupling the pick-up from the track. As the phase shift changes the effective output voltage, and hence the current, the power output can be controlled through the phase-shift.

Figure 4:
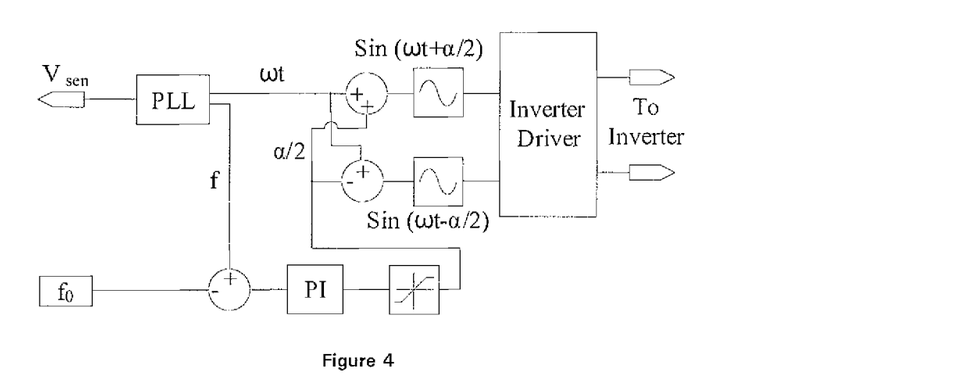
FIG. 4 shows a block diagram of a pick-up controller according to one embodiment of the present invention.

A block diagram of one embodiment of a pick-up droop controller 4 according to the present invention is shown by way of example in FIG. 4. The pick-up controller 4 senses the pick-up coil $L_{Si}$; voltage $V_{si}$ and uses a phase locked loop (PLL) to determine the frequency of the primary converter. The error between the operating frequency and the tuned frequency $f_0$ is fed into a proportional integral (PI) controller to generate the phase-shift α that is required to extract the desired power. Limits are placed on the output of the PI controller to ensure that the phase-shift stays between 0° and 360°. At 180°, no power is transferred while 0° and 360° correspond to the maximum power in the forward and reverse direction, respectively.

The output current of the pick-up given by Eq. (8) was derived under fully tuned conditions as given by Eq. (3). However, the droop controller varies the frequency of operation to regulate the power intake of the pick-up. Except at rated power, the system therefore operates in a de-tuned state. The impact on the magnitude of both real and reactive power due to variation of frequency can be investigated by deriving expressions for system variables under de-tuned conditions.

For any given angular frequency of operation ?, the output current of the pick-up is given by Eq. (15).

$$I_{so} = \frac{\frac{V_{pi}}{Z_2} + \left(\frac{1}{Z_1} + \frac{1}{Z_2}\right)\left(\frac{\omega M}{Z_2}\right)^2 V_{so}}{1 + \left(\frac{1}{Z_1} + \frac{1}{Z_2}\right)^2 (\omega M)^2} - \left(\frac{1}{Z_1} + \frac{1}{Z_2}\right)V_{so} \quad (17)$$

where $L_T = L_{pi} = L_{si} = L_{so} = L$, $C_T = C_s = C$, $Z_1 = \frac{Z}{j\omega L}, Z_2 = \frac{Z}{\frac{1}{j\omega C}}, Z = \left((j\omega L)^2 + \frac{2L}{C}\right)$ The real power output of the pick-up is given by (9) and the reactive power $Q_o$ of the pick-up is given by Eq. (16).

$$Q_o = Im\{V_{so}(-I_{so})^*\} \quad (18)$$

When the system is operating at the tuned frequency, the real and reactive power components of the pick-up are given by Eq. (10) and (17).

$$Q_o = \frac{M|V_{si}|}{L_{si}\omega L_T}|V_{so}|\cos(\theta) \qquad (19)$$

Figure 5:
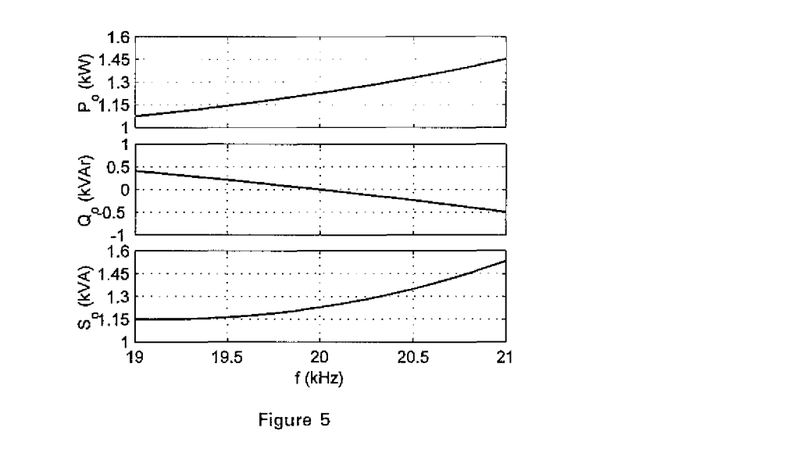
FIG. 5 shows waveforms of the real, reactive, and apparent power vs frequency in an IPT system.

Thus, the impact on $P_o$ and $Q_o$ due to the changes in frequency can be analyzed by using Eq. (9), (15) and (16). FIG. 5 illustrates how the real, reactive and apparent components of power vary with the operating frequency. As analytical expressions are used to compute power, both primary and pick-up side converters are assumed to produce rated voltages at relative phase angle of 90°. It is evident from FIG. 5 that the system is operating at unity power factor at the tuned frequency of 20 kHz, as given by Eq. (17). As the frequency of the system is varied, the reactive power requirement of the system increases and, consequently, the VA rating also increases. However, if the maximum frequency variation adopted by the droop controller is kept within a narrow band, then the increase in both reactive and apparent power is relatively small and will not compromise the VA rating of converters.

Simulations of the 'droop' control technique of the invention have been experimentally verified with a prototype IPT system comprising a 1 kW primary bi-directional converter and a 1.5 kW bi-directional pick-up converter. The parameters of the prototype system are given in Table 1.

TABLE 1

| Parameter | Value |
| --- | --- |
| $V_{DC}$, $V_{out}$ | 200 V |
| $L_{PI}$ and $L_{SO}$ | 24 µH |
| $C_T$ and $C_S$ | 2.47 µF |
| $L_T$ and $L_{si}$ | 24 µH |
| $P_{Pmax}$ | 1 kW |
| $f_o$ | 20 kHz |
| $f_{min\text{-}p}$ | 19.6 kHz |
| $f_{max\text{-}p}$ | 20.4 kHz |
| df/dp | 0.2 Hz/W |
| $P_{Smax}$ | 0.5 kW or 1.5 kW |
| M | 5 µH |
| ? | 85% |
| Air gap | 55 mm |

The primary and pick-up side 'droop' controllers were implemented using ATmega-324P model 8-bit microcontrollers, available from Atmel Corporation of San Jose, Calif. The primary side converter, supplied by a 200 V DC supply and limited to 1 kW, was controlled to produce a square-wave voltage and maintain a constant track current of 55 A. The pick-up was magnetically coupled to the track to either provide or extract power from the primary converter. The pick-up side converter was operated from a 200 V DC supply and driven with a 90 degree phase delay with respect to the primary, ensuring that the system operates at unity power factor when tuned in accordance with Eq. (10). The pick-up controller operates the pick-up side converter at frequencies dictated by the primary converter, and varies the phase-shift between the two legs of its full bridge converter to control the amount of power being supplied or extracted.

Figure 6:
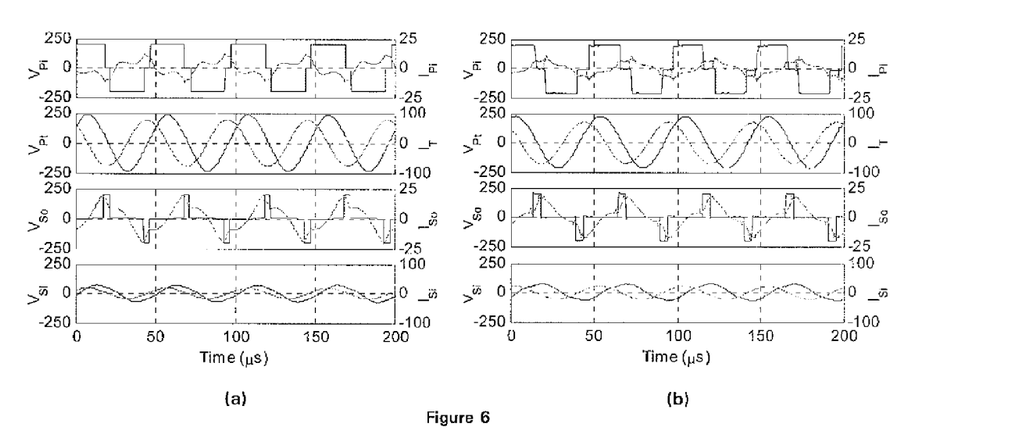
FIG. 6 shows (a) simulated; and (b) experimental waveforms of the primary and secondary converters of a prototype IPT system according to an embodiment of the present invention, when pick-up demand is within the primary capability.

Simulated steady state waveforms of the system when the pick-up has a lower power rating than that of the primary are shown in FIG. 6(a). The primary operates at slightly off tuned frequency to meet the lower power demand. From the top and third plot, it is evident that the pick-up produces a square wave voltage $V_{si}$ that lags the primary converter voltage $V_{pi}$. Thus power flows from the primary to the pick-up. The track current $I_T$ is sinusoidal and constant at approximately 55 A rms.

FIG. 6(b) shows the experimental results under the same conditions and, as evident, both the simulated and experimental results are very similar.

Figure 7:
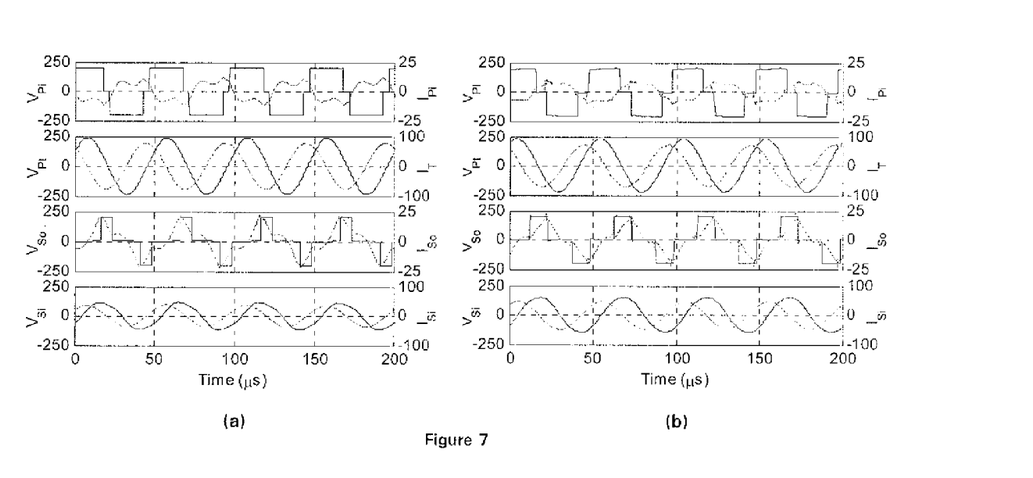
FIG. 7 shows (a) simulated; and (b) experimental waveforms of the primary and secondary converters of the same IPT system, when pick-up demand is limited by the primary capability.

FIG. 7 shows both (a) simulated and (b) experimental waveforms of the system when the pick-up has a higher power demand than the primary power capability of 1 kW. To increase the pick-up power, the magnitude of $V_{so}$ was increased by increasing the phase shift α (i.e. increasing the duty cycle of the secondary inverter). The increase in $V_{so}$ is evident from FIG. 7. As the pick-up power reaches approximately 1 kW, the primary frequency converges to the tuned frequency to force the pick-up controller to limit its power to maximum of 1 kW. Despite the change in output power the primary controller has maintained a constant track current $I_T$. In this situation, too, both the simulation and experimental results are in very good agreement.

Figure 8:
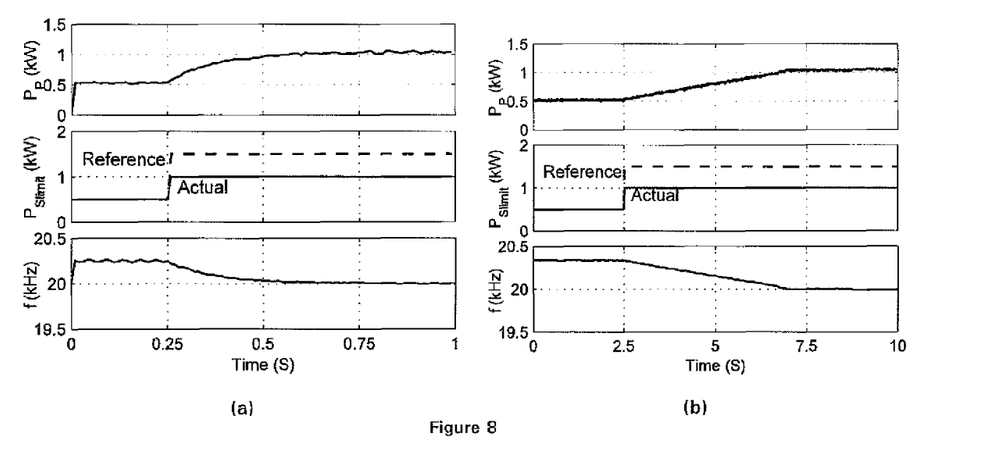
FIG. 8 shows (a) simulated; and (b) experimental power and frequency waveforms of the same IPT system, with the system operating in a forward power transfer mode.

FIG. 8(a) shows the simulated variations in primary power, pick-up power limit and operating frequency with time. Initially the pick-up controller is set to a maximum power level of 0.5 kW. Thus the system settles to operate at a frequency greater than $f_0$ indicating that the primary supply is not operating at its maximum power level. At 0.25 s, the pick-up power reference is changed to 1.5 kW, which is greater than the power capability of the primary supply. The pick-up controller gradually increases the power intake and the primary controller reduces the operating frequency to indicate that the power intake is reaching the maximum capability of the primary. Eventually, the operating frequency settles at the tuned frequency of 20 kHz and the pick-up limits its power intake to 1 kW despite the higher reference value of 1.5 kW. FIG. 8(b) shows the experimental results under the same conditions. Apart from slower response time of the pick-up controller, caused by limited processing power of the microcontroller of the prototype, both simulated and experimental results are in good agreement and confirm the validity of the droop control technique.

Figure 9:
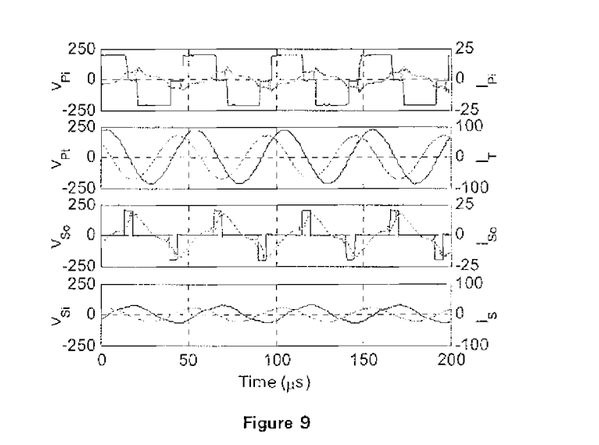
FIG. 9 shows experimental waveforms of the primary and secondary converters of the same system, during reverse power flow.

FIG. 9 shows the measured voltage and current waveforms of the primary and secondary converters of the prototype during the reverse power flow. The voltage and current magnitudes of both converters are similar to those corresponding to the forward power flow but, as expected, the primary converter voltage $V_{pi}$ lags the pick-up voltage $V_{so}$. The power flow is once again controlled by varying the magnitude of the pick-up voltage $V_{so}$, using a phase-shift α between the legs of the converter to control the duty cycle thereof.

Figure 10:
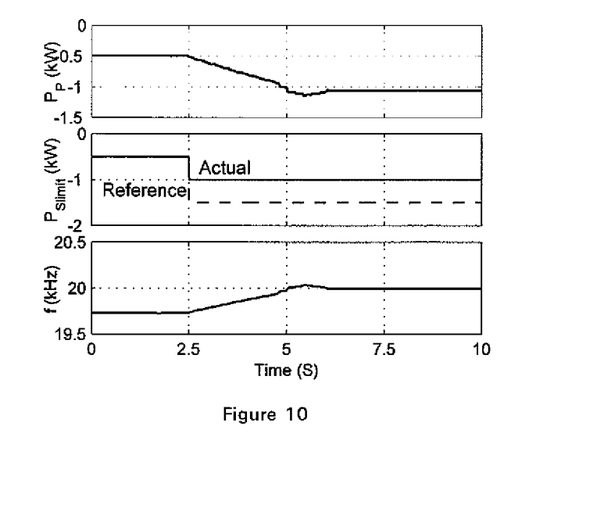
FIG. 10 shows the measured power and frequency waveforms of the same prototype IPT system, with the system operating in a reverse power transfer mode.

The measured behaviour of the controller during reverse power flow is shown in FIG. 10. The reference power level of the pick-up converter was initially set to 0.5 kW, and the system deviates below the tuned frequency $f_0$, delivering 0.5 kW to the primary. It should be noted that the negative reference (i.e. operating frequency being below the tuned frequency) denotes the reverse power flow (i.e. from the pick-up to the primary). At 0.25 s, the reference power level of the pick-up was raised to 1.5 kW, exceeding the capability of the primary. The secondary controller gradually increases power, preferably in a number of steps, and the primary controller responds by increasing the operating frequency which converges toward the tuned frequency of 20 kHz as it reaches its power limit of 1 kW. At that point, the secondary controller senses that the operating frequency is at the tuned frequency $f_0$ and limits the power transfer to 1 kW even though the pick-up is capable of supplying more power.

SECOND EXAMPLE

In an alternative embodiment of the invention, the primary controller is adapted to periodically or intermittently modulate the frequency of the track current, operating at the tuned frequency $f_0$ for the majority of time. Thus, whereas the first example of the invention may be said to maintain the (variable) operating frequency continuously, or at least repetitively monitor the operating frequency, this second example alternates between the variable operating frequency and the fixed tuned frequency $f_0$.

The primary converter thus relays information with regard to its remaining power capability to the or each pick-up for a short duration while operating at the desired tuned frequency for the remainder of the time to minimise the VA rating of the system. According to its own characteristics, the or each pick-up extracts power as dictated by the frequency modulation.

As described above, it is always preferable to operate the system at the tuned frequency, $f_0$, of the L-C-L networks to maximize the power output while minimizing the VA requirement. Operation of the system at a frequency slightly above or below the tuned frequency will invariably result in a drop in the maximum power that the system can provide. However, by only changing the frequency for short periods of time, for the majority of time the system is operating at the tuned frequency and supplying the maximum real power, with minimal reactive power.

According to this embodiment of the invention, therefore, both the primary and pick-up controllers operate at the tuned frequency except during the moment of the modulation. The operation frequency is changed slowly (i.e. ramped up or down in a plurality of incremental steps) during modulation, so that the pick-up is able to stay synchronized (i.e. maintain the same frequency) with the primary. ?P represents the difference between the maximum power and the current power being supplied by the primary converter. The tuned frequency, $f_0$, corresponds to the primary outputting maximum power; the maximum and minimum frequencies, $f_{max}$ and $f_{min}$, correspond to the no load or maximum available power in the forward and reverse directions, respectively. Usually $f_{max}$ and $f_{min}$, are set to a few hundred hertz above or below the tuned frequency, as described above with respect to the first example, to ensure that the LCL networks remain substantially tuned to the operating frequency.

Figure 12:
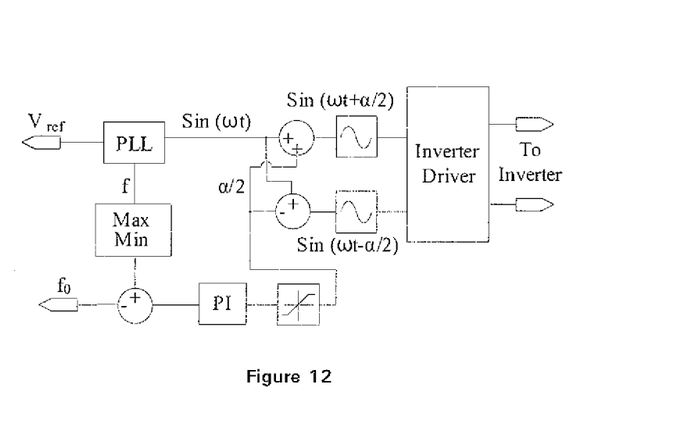
FIG. 12 is a block diagram of an example secondary controller according to the second embodiment of the invention.

The power flow between the primary and the pick-up can be regulated through control of the voltage generated by the pick-up side converter. A block diagram of a suitable controller is shown by way of example in FIG. 12. The voltage generated by the pick-up converter, $V_{so}$, is regulated as desired by controlling a, the phase shift between switching the legs of the converter and is given by Eq. (18).

$$V_{so} = -V_{out}\frac{4}{\pi}\sum_{n=1,3...}^{\infty}\frac{1}{n}\cos(n\omega_T t + \theta)\sin\left(\frac{n\alpha}{2}\right) \quad (18)$$

where $V_{out}$ is the DC output voltage, $\omega_T = 2\pi f_0$ and $\theta$ is the phase delay between $V_{pi}$ and $V_{so}$.

Figure 11:
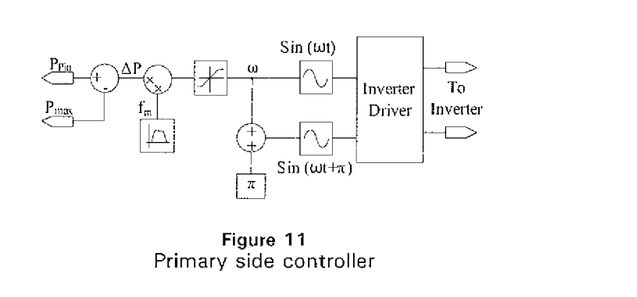
FIG. 11 is a block diagram of an example primary controller according to the second embodiment of the invention.

The primary controller as shown in FIG. 11 measures the power ($P_{Pin}$) which is the power that flows out of the primary converter. This is then subtracted from the maximum power that the primary can supply, which gives $\Delta P$, the remaining available power that the primary is able to supply. The variable $\Delta P$ is then multiplied by a modulation function which varies the frequency of the primary inverter. A frequency modulation preferably occurs periodically once every second, however, when the power flow is rapidly changing the controller will generate jitters (i.e. periodic modulation of the operating frequency) more frequently, to ensure that the system is operating stably.

Operation of a control technique in accordance with this embodiment of the invention will be described in further detail below with reference to an example IPT system as shown in FIG. 1, comprising a 2.5 kW primary bi-directional converter together with a 3 kW pick-up converter.

The primary and pick-up converters are controlled to produce square wave voltages, $V_{pi}$ and $V_{so}$. The primary is controlled to maintain a constant track current of 45 A. This current is operated at the tuned frequency $f_0$, with jitters in the operating frequency occurring periodically, during which the remaining available power is communicated to the or each pick-up of the secondary side via the shift in frequency. The pick-up converter is driven with a p/2 radians phase delay with respect to the primary. The pick-up controller is able to vary the phase-shift α between the legs of the converter, controlling the power being extracted or supplied from the converter by effectively varying the duty cycle of the converter.

Figure 13:
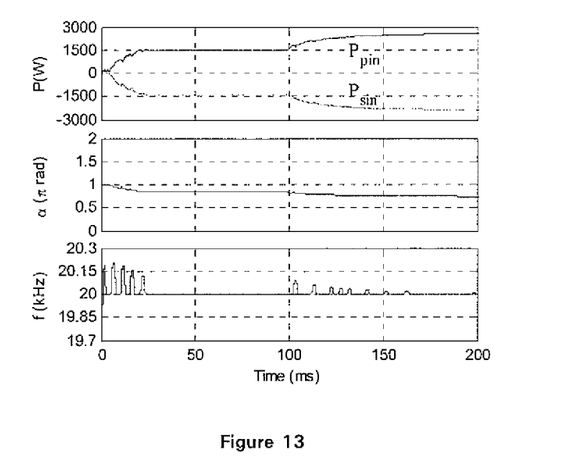
FIG. 13 shows power and frequency waveforms of an example IPT system according to the second embodiment of the invention.
Figure 14:
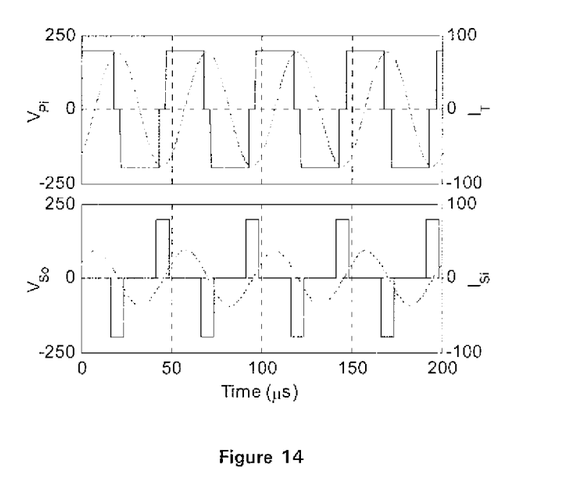
FIG. 14 shows primary and secondary converter waveforms of the same example IPT system.

FIG. 13, shows the power, frequency and phase shift (a) of the system supplying power from the primary to pick-up. The primary controller is set to limit at 2.5 kW, the pick-up controller is initially set to limit at 1.5 kW. After 100 ms the pick-up limit is increased to 3 kW, which is greater than the 2.5 kW that the primary can supply; this causes the pick-up controller to limit the power that it takes. The frequency (f) shows that for the majority of the time the system operates at the tuned frequency (20 kHz). However, during the jitters the frequency changes slightly. FIG. 14 shows the operation of the converter at the high power steady state point. It can be seen that the primary converter is operating with a 100% duty cycle, whereas the duty cycle of the secondary converter is substantially less to limit the power drawn by the load to the maximum of 2.5 kW. The primary track current $I_T$ is a constant sinusoidal at 45 A.

It will be appreciated from the foregoing that the present invention in various aspects may be said to consist in a load control method; an IPT power supply adapted to vary frequency to provide an indication of available power; an IPT pick-up adapted to sense variations in the track frequency and limit power transfer accordingly; and/or an IPT system using variations in frequency of the track current to communicate available power from the primary to the or each pick-up. The IPT system may be either uni-directional or bi-directional, and may comprise one or more IPT pick-ups without departing from the scope of the invention.

A controller according to the present invention may be implemented purely in hardware consisting of one or more components which may include discrete electronic components or integrated circuits. Alternatively, or additionally, the invention may be implemented using programmable hardware components, such as programmable logic devices (PLDs) or field programmable gate arrays (FPGAs), or by software executed by a computing means or processor which may include a microcontroller or general purpose personal computer (PC) programmed accordingly. Typically, however, the invention would be implemented as an embedded system using a combination of the aforementioned components.

The present invention thus provides an IPT load control technique which utilizes the power-frequency characteristics of the system to regulate the power flow in both directions while limiting the power, when necessary, without a dedicated communication link. The controller is relatively easy to implement, robust, and low in cost without a dedicated communication link. It is applicable for either single or multiple pick-up IPT systems, and ideal for applications such as vehicle-to-grid (V2G) systems, where electric vehicles (EVs) of varying power ratings are to be 'effectively' charged/discharged from a single primary supply. The control technique works with bi-directional systems, so that the "secondary" side or pick-up becomes the "primary" side and the same technique is used.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A control method for use in a primary side power converter of an inductive power transfer (IPT) system, the method comprising the steps of:
    sensing power transfer between the primary side power converter and one or more IPT pick-ups with which the primary side power converter is capable of being inductively coupled, in use; and
    varying the operating frequency of the primary side power converter in proportion to a difference between said power transfer and a power capability of the primary side power converter, whereby said variation is capable of being sensed by each of the one or more pick-ups to regulate said power transfer.

2. The method according to claim 1 wherein the step for varying the operating frequency comprises varying the operating frequency in incremental steps.

3. The method according to claim 1 wherein the step of varying the operating frequency comprises periodically varying the operating frequency.

4. The method according to claim 3 wherein the step of varying the operating frequency comprises maintaining the operating frequency for a portion of each period, and reverting to the tuned frequency for the remainder of each period.

5. The method according to claim 1 wherein the tuned frequency is a frequency to which resonant circuits of both the primary and secondary sides are tuned.

6. The method according to claim 1 wherein the method includes continuously monitoring the power transfer.

7. The method according to claim 1 wherein the method includes the step of periodically monitoring the power transfer.

8. The method according to claim 1 including the step of varying the operating frequency within a predetermined range of the tuned frequency.

9. An inductive power transfer primary side power converter, the converter including a sensor to sense power transfer between the primary side power converter and one or more IPT pick-ups with which the primary side power converter is capable of being inductively coupled in use; and
    a controller for varying the operating frequency of the primary side power converter with respect to a tuned frequency in proportion to a difference between said power transfer and a power capability of the primary side power converter, whereby said variation is capable of being sensed by each of the one or more pick-ups each pick-ups to regulate said power transfer.

10. The inductive power transfer primary side power converter according to claim 9 wherein the operating frequency is varied in incremental steps.

11. The inductive power transfer primary side power converter according to claim 9 wherein the controller periodically varies the operating frequency.

12. The inductive power transfer primary side power converter according to claim 11 wherein the controller maintains the operating frequency for a portion of each period, and reverts to the tuned frequency for the remainder of each period.

13. The inductive power transfer primary side power converter according to claim 9 wherein the tuned frequency is a frequency to which resonant circuits of both the primary and secondary sides are tuned.

14. The inductive power transfer primary side power converter according to claim 9 wherein the controller continuously monitors the power transfer.

15. The inductive power transfer primary side power converter according to claim 9 wherein the controller periodically monitors the power transfer.

16. The inductive power transfer primary side power converter according to claim 9 wherein the controller varies the operating frequency within a predetermined range of the tuned frequency.

17. The method according to claim 2 wherein the step of varying the operating frequency comprises periodically varying the operating frequency.

18. The method according to claim 17 wherein the step of varying the operating frequency comprises maintaining the operating frequency for a portion of each period, and reverting to the tuned frequency for the remainder of each period.

19. The inductive power transfer primary side power converter according to claim 10 wherein the controller periodically varies the operating frequency.

20. The inductive power transfer primary side power converter according to claim 19 wherein the controller maintains the operating frequency for a portion of each period, and reverts to the tuned frequency for the remainder of each period.

* * * * *